(12) United States Patent
Kalmus

(10) Patent No.: US 9,796,442 B1
(45) Date of Patent: Oct. 24, 2017

(54) WINDSHIELD IMPACT REDUCTION SYSTEM SUITABLE FOR MOTORCYCLES

(71) Applicant: John W. Kalmus, Melbourne, FL (US)

(72) Inventor: John W. Kalmus, Melbourne, FL (US)

( * ) Notice: Subject to any disclaimer, the term of this patent is extended or adjusted under 35 U.S.C. 154(b) by 97 days.

(21) Appl. No.: 14/928,300

(22) Filed: Oct. 30, 2015

Related U.S. Application Data

(60) Provisional application No. 62/084,167, filed on Nov. 25, 2014.

(51) Int. Cl.
  *B62J 17/04* (2006.01)
  *B60J 1/06* (2006.01)

(52) U.S. Cl.
  CPC ...... *B62J 17/04* (2013.01); *B60J 1/06* (2013.01)

(58) Field of Classification Search
  CPC .................................. B62J 17/04; B60J 1/06
  USPC .................................. 296/78.1, 96.21, 84.1
  See application file for complete search history.

(56) References Cited

U.S. PATENT DOCUMENTS

| | | | |
|---|---|---|---|
| 1,387,349 A * | 8/1921 | Campbell | B62J 17/00 296/78.1 |
| 3,081,127 A | 3/1963 | Orowan | |
| 3,891,265 A * | 6/1975 | Blackburn | B62J 17/04 296/78.1 |
| 4,087,110 A * | 5/1978 | Vetter | B62J 17/04 296/78.1 |
| 4,465,315 A * | 8/1984 | Barstow | B62J 17/04 296/78.1 |
| 5,788,313 A * | 8/1998 | Willey | B62J 17/04 296/78.1 |
| 6,254,166 B1 * | 7/2001 | Willey | B62J 17/04 296/77.1 |
| 7,175,222 B2 * | 2/2007 | Gray | B62J 17/00 296/78.1 |
| 7,357,439 B1 * | 4/2008 | Morin | B62J 17/04 296/78.1 |
| 7,665,792 B1 * | 2/2010 | Flynn | B60J 1/06 296/84.1 |
| 7,828,359 B2 | 11/2010 | Caprio | |

OTHER PUBLICATIONS

Koplin Clear Half-Folding Windshield—2456 ATV & UTV— Dennis Kirk Inc., retrieved on Oct. 12, 2015, retrieved from https:///www.denniskirk.com/kolpin/clear-half-folding-windsheild, 2 pages.

Folding Windshield at Motorcycle Superstore, retrieved on Oct. 30, 2015, retrieved from www.motorcycle-superstore.com, 1 page.

(Continued)

*Primary Examiner* — Jason S Morrow
*Assistant Examiner* — E Turner Hicks
(74) *Attorney, Agent, or Firm* — Brian S. Steinberger; Law Offices of Brian S. Steinberger, P.A.

(57) ABSTRACT

Replaceable forward foldable curved motorcycle windshield assemblies, systems, devices and methods with a base separated from an upper curved main section attached together with a pair of hinges which allows the main section to fold outward away in a vertical to horizontal direction forward of the motorcycle when force is applied to the main section of windshield. An elongated trim covers the upper leafs of the hinges between of the windshield. The base of the windshield is hidden beneath the existing mounting frame on the motorcycle.

14 Claims, 22 Drawing Sheets

(56) References Cited

OTHER PUBLICATIONS http://stucco.com/s/Slipstreamer+Windsheilds-MbSLsTI-But-Exclusive-Deals-70-OFF-Save-Big-Lowest-Price-On-Slipstrearner-Windsheilds-Best-In-Stock-Fast-Free, retrieved 10/30/5015, retrieved from stucco.com, 3 pages.
http://4wheelonline.com/atv/Quadboss-Folding_Windsheild.106396.607699. retrieved on Oct. 30, 2015, retrieved from http://4wheelonline.com, 3 pages.
National Cycle Windshields & Accessories for Motorcycles, retrieved on Oct. 30, 2015, retrieved from http://www.cruisercustomizing.com/, 3 pages.
Motorcycle Windshiels, retrieved on Oct. 30, 2015, retrieved from http://www.sears.com/automotive-motorcycle-parts-windshields/b-1203761105, 2 pages.

\* cited by examiner

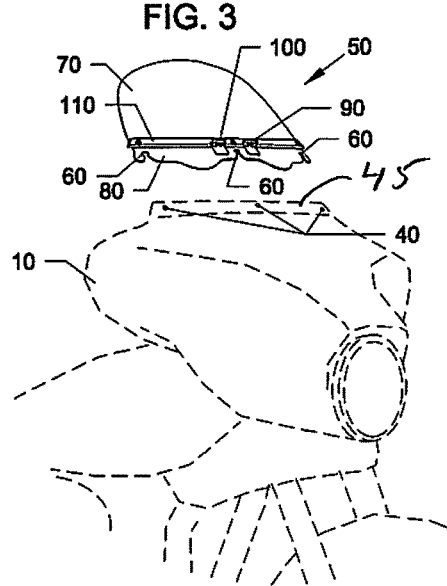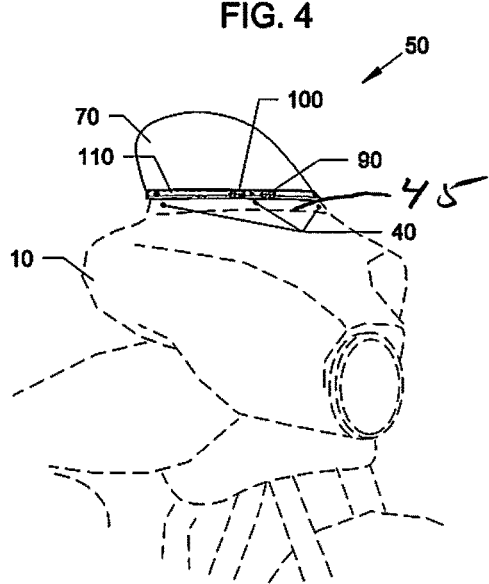

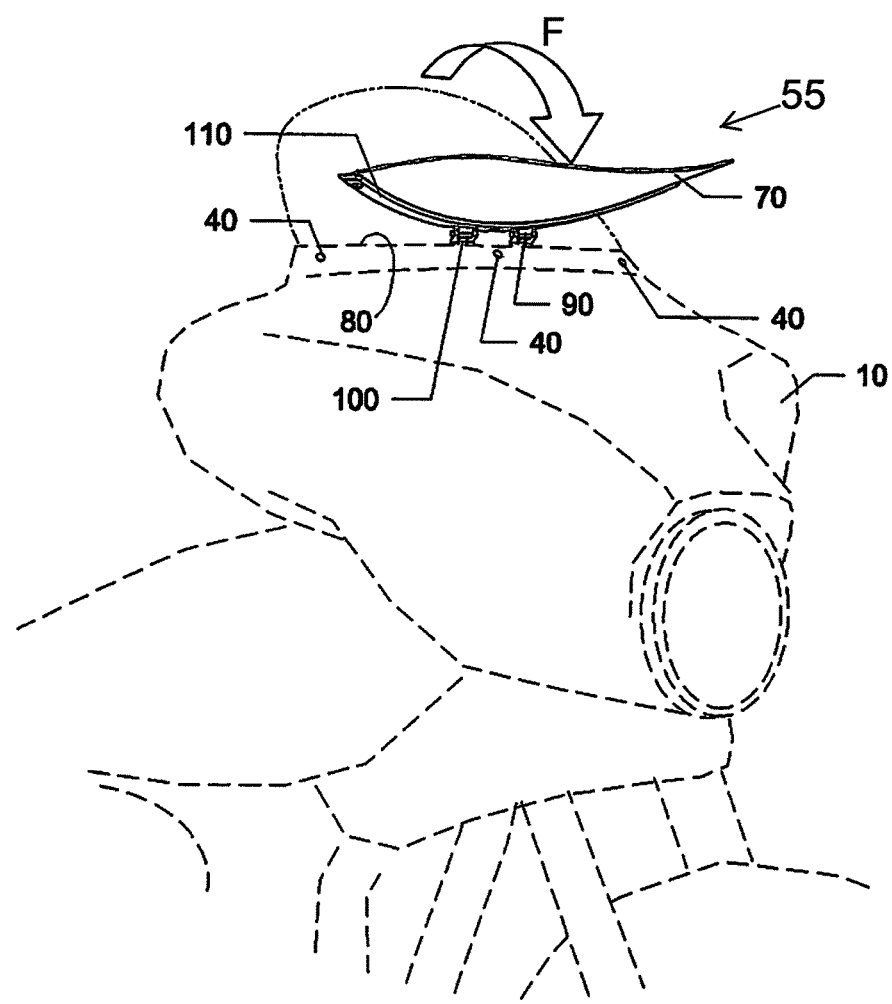

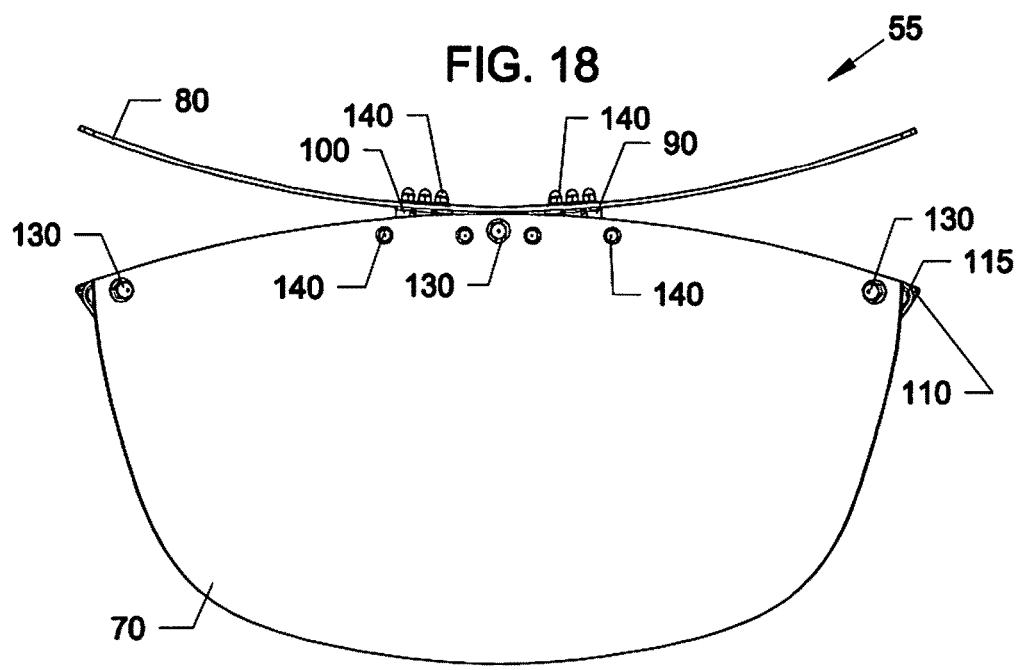
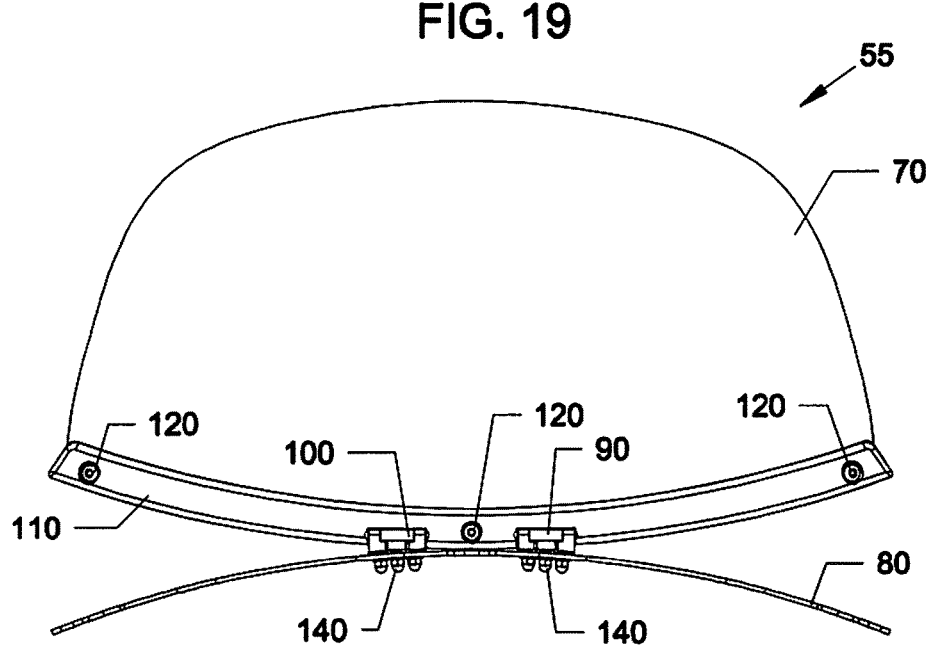

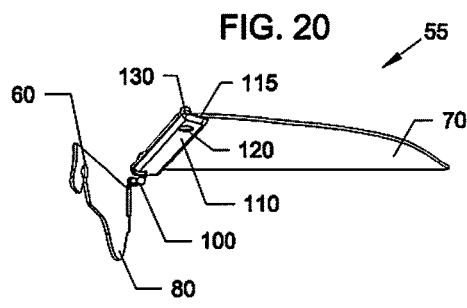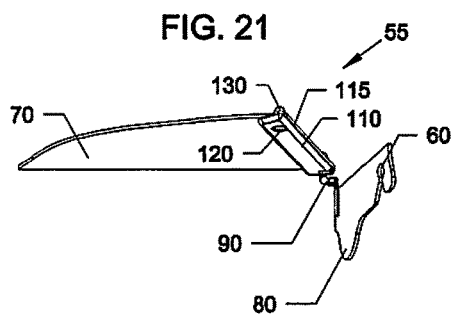

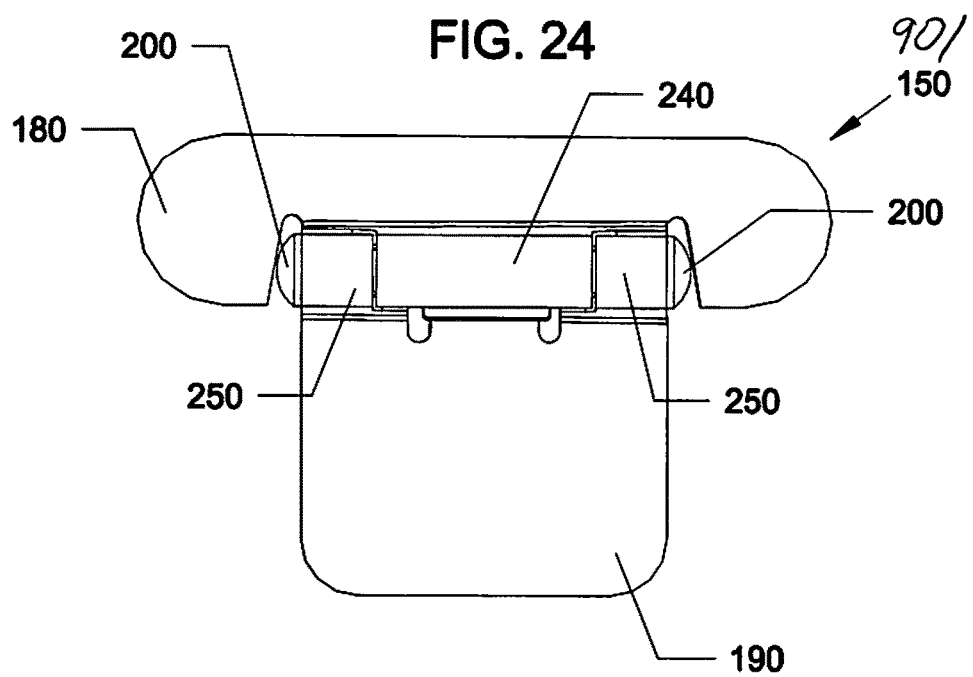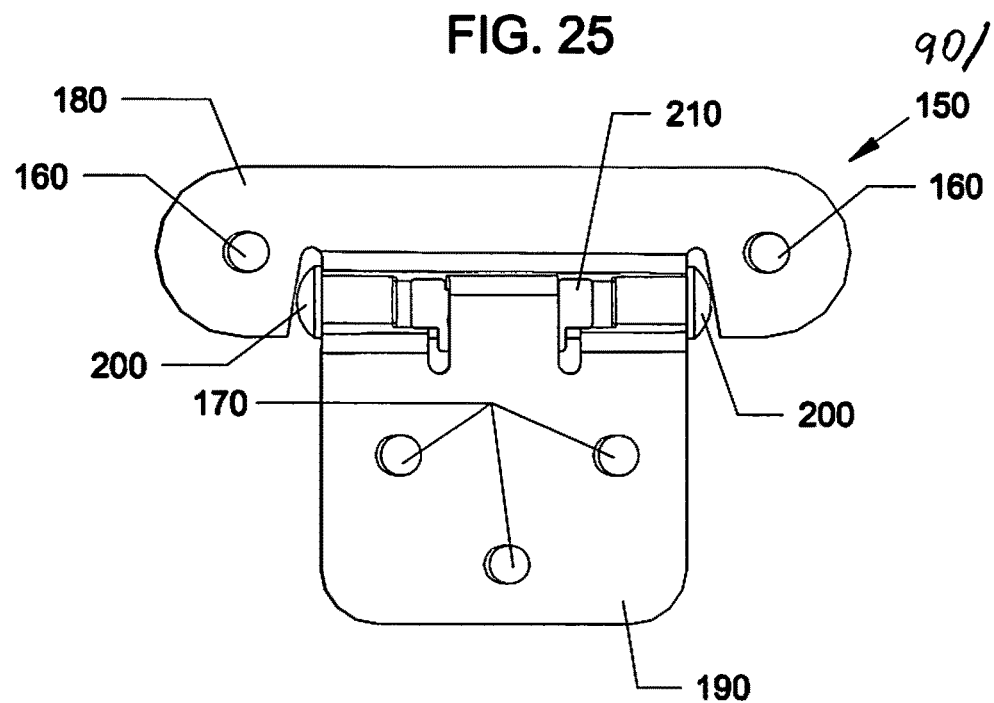

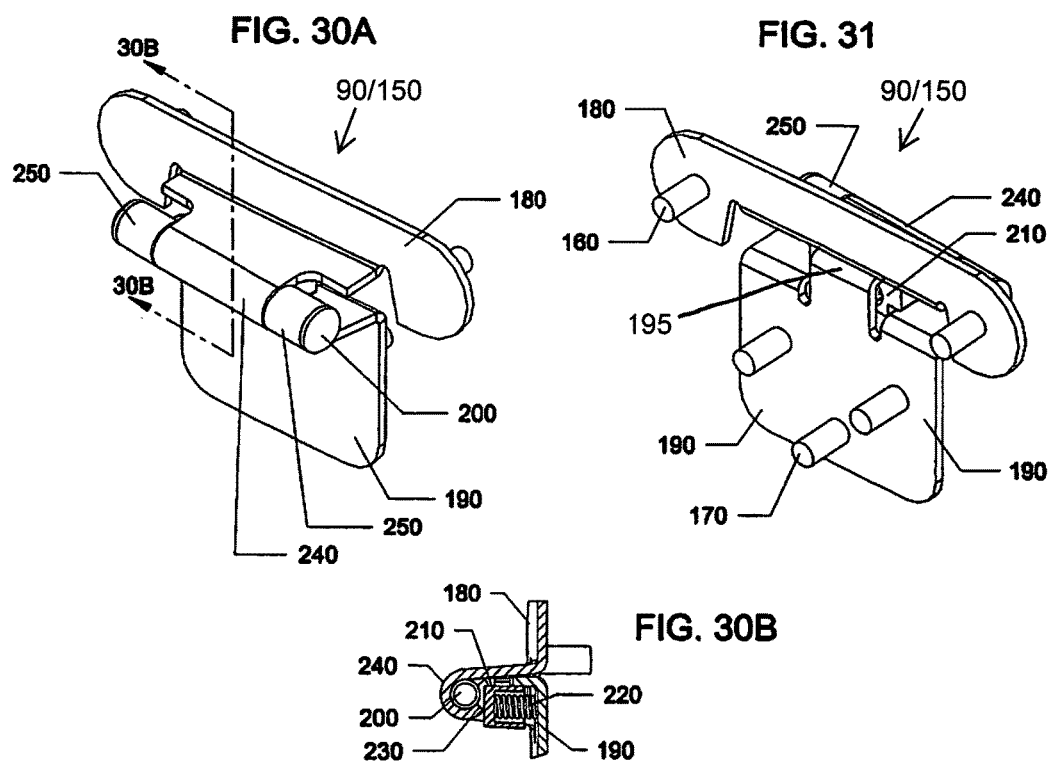

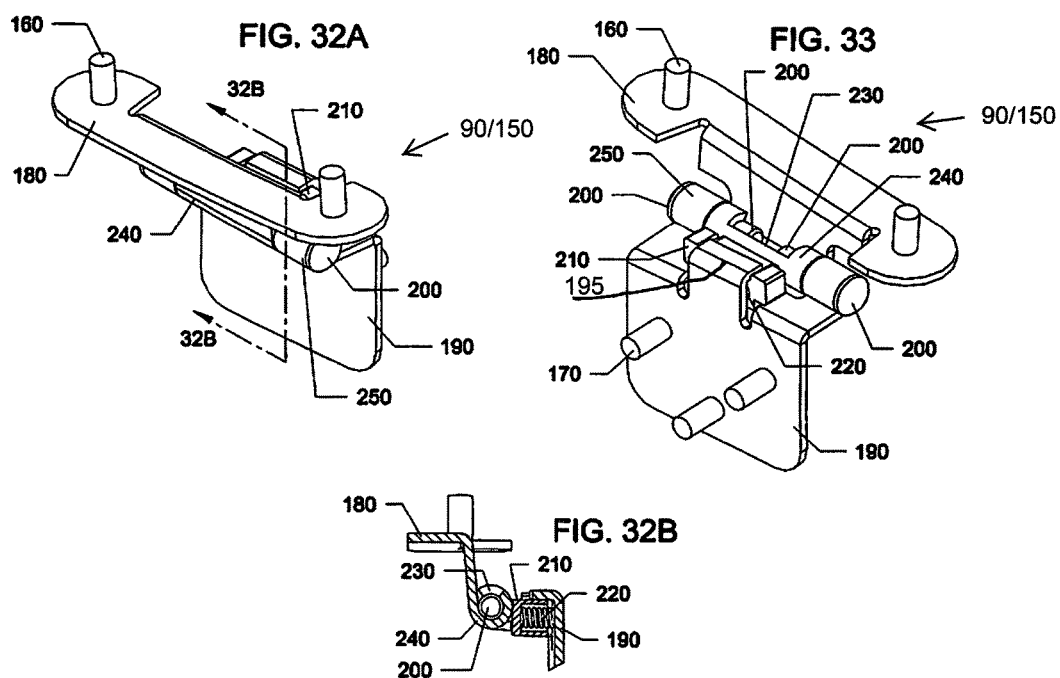

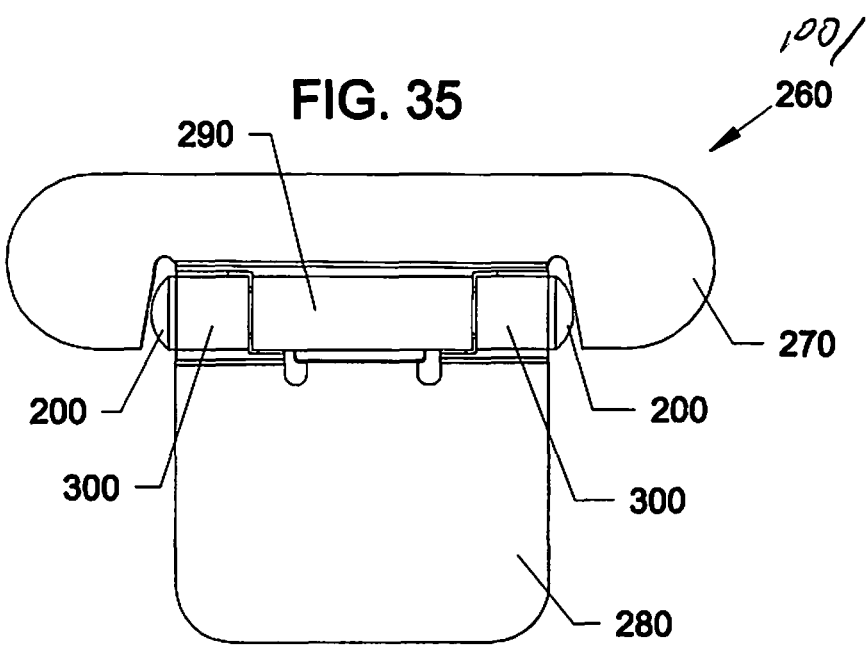
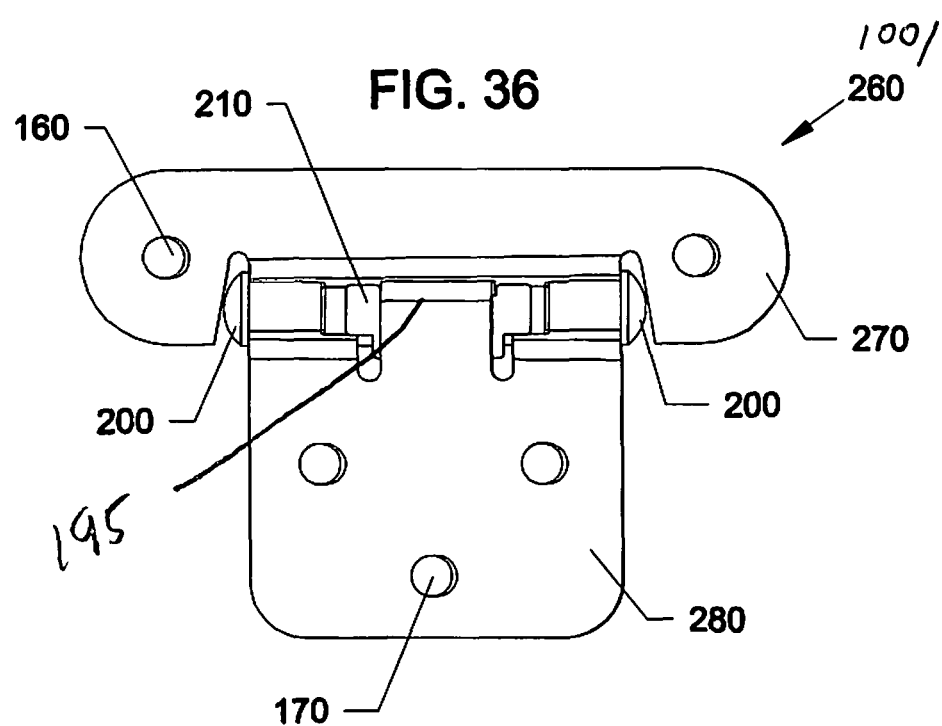

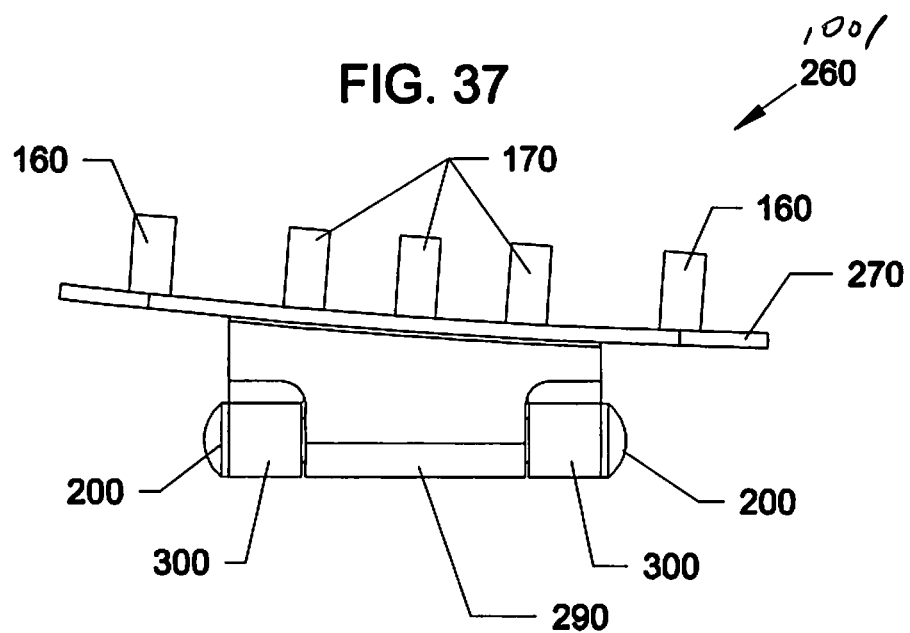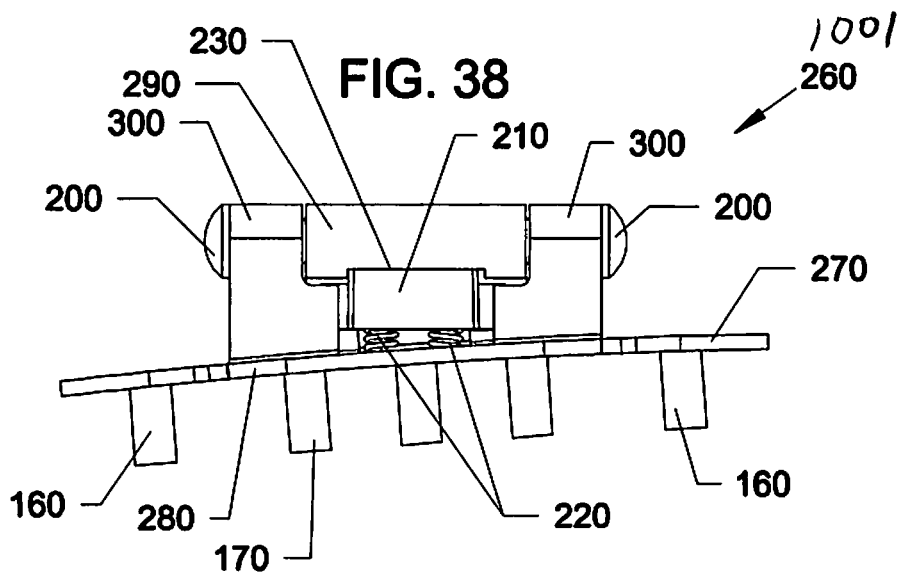

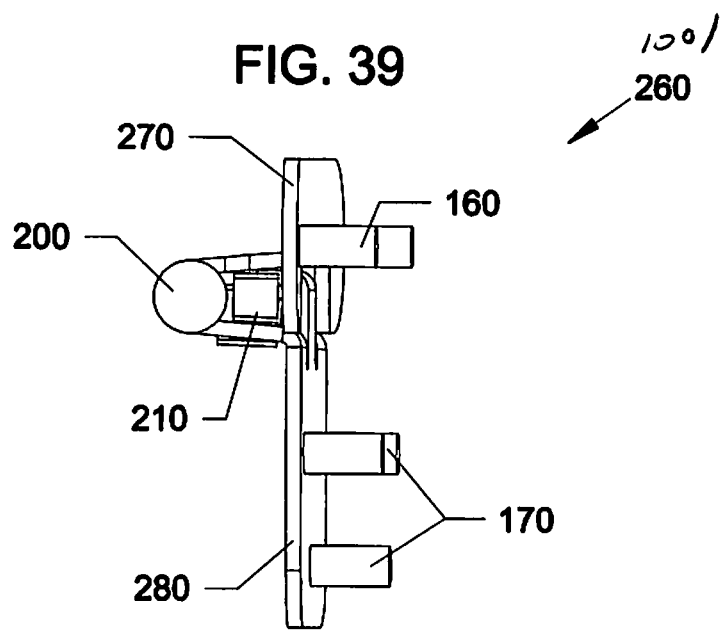
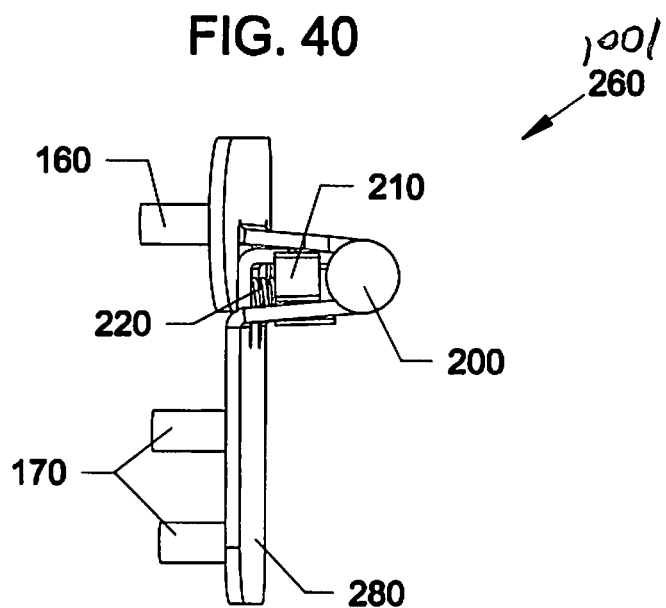

WINDSHIELD IMPACT REDUCTION SYSTEM SUITABLE FOR MOTORCYCLES

CROSS REFERENCE TO RELATED APPLICATIONS

This application claims the benefit of priority to U.S. Provisional Application Ser. No. 62/084,167 filed Nov. 25, 2014, the entire disclosure of which is incorporated by reference in its' entirety.

FIELD OF INVENTION

This invention relates to windshield safety for motorcycles, and in particular to replaceable forward foldable curved motorcycle windshield assemblies, systems, devices and methods with a curved translucent base separated from an upper curved translucent main section attached together with a pair of curved hinges which allows the main section to fold outward away in a vertical to horizontal direction forward of the motorcycle when force is applied to the main section of windshield.

BACKGROUND AND PRIOR ART

Most motorcycles have their windshields rigidly mounted in place as a solid structure which does not move relative to the motorcycle. The windshields are generally made from tempered glass which can break into multiple small pieces or from hard material such as acrylic, and the like. During an abrupt stop or in an impact from an accident, the motorcyclist is thrust forward. The impact with the hard plastic or glass has been known to cause head injury to the cyclist. Windshields made from break away materials such as tempered glass have been known to break into shards from the impact which can cause severe lacerations to the face, neck and upper torso.

Over the years attempts have been made to have some fold out capability to a motorcycle windshield. See for example, U.S. Pat. No. 1,387,349 to Campbell; U.S. Pat. No. 4,087,110 to Vetter; and U.S. Pat. No. 4,465,315 to Barstow. However, there are many problems with these attempts.

The Campbell '349 reference requires a separate piston arrangement to be clamped to a steering wheel which both can obstruct the field of vision of the cyclist as well as be a hazard to the cyclist if an impact or accident occurs since the cyclists can easily hit into the obstructing piston post.

The Vetter '110 reference requires a fairing with an upper edge having a recessed seat 30 where the bottom of the folding windshield is fit into, and hinges attach the bottom of the windshield to the separate fairing. In addition to the expense of requiring a separate fairing, this devices requires extra hardware such as clips 18 to secure edges of the windshield in addition to the flat hinges 16, and would appear to be expensive and difficult to manufacture and attach onto existing curved motorcycle windshields or fairings.

The Barstow '315 reference requires an unsightly continuous hinge contraption that also adds extra weight and substantially greater expense to the motorcycle over typical windshields Thus, the need exists for solutions to the above problems with the prior art.

SUMMARY OF THE INVENTION

A primary objective of the present invention is to provide safe replaceable forward foldable curved motorcycle windshield assemblies, systems, devices, and methods with a base separated from an upper curved main section attached together with a pair of curved hinges which allows the main section to fold outward away in a vertical to horizontal direction forward of the motorcycle when force is applied to the main section of windshield.

A secondary objective of the present invention is to provide safe replaceable forward foldable curved motorcycle windshield assemblies, systems, devices, and methods that both aesthetic and not unsightly to the cyclist.

A third objective of the present invention is to provide safe replaceable forward foldable curved motorcycle windshield assemblies, systems, devices, and methods, having minimal hardware by using only curved hinges, hinge fasteners, and an elongated curved trim piece.

A fourth objective of the present invention is to provide safe replaceable forward foldable curved motorcycle windshield assemblies, systems, devices, and methods that has no more substantial weight to the motorcycle over an existing windshield.

A fifth objective of the present invention is to provide safe replaceable forward foldable curved motorcycle windshield assemblies, systems, devices, and methods that is generally no more expensive than a traditional windshield.

A sixth objective of the present invention is to provide safe replaceable forward foldable curved motorcycle windshield assemblies, systems, devices, and methods of using a folded curved windshield with an elongated trim that covers upper leafs of curved hinges, wherein the base of the curved windshield is hidden beneath the existing mounting frame on the motorcycle.

An embodiment of the retrofit windshield for a motorcycle can include a curved windshield having a translucent upper curved section with an top edge and a bottom edge, a front face and a rear face, and a translucent lower base section with a top edge having an identical contour to the bottom edge of the upper curved section, and a front face and a rear face, the lower base section having a bottom end being mountable to an existing frame on a motorcycle, a curved hinge having a top leaf attached to a front portion of the upper section of the windshield adjacent to the bottom edge, and the curved hinge having a bottom leaf attached to a front portion of the lower base section adjacent to the top edge of the lower base section, and a trim across the front face of the upper windshield section covering the top leaf of the curved hinge, wherein the windshield folds to a front of the motorcycle when a force is applied to a rear surface to the upper windshield section.

The retrofit windshield can further include slots and fasteners for attaching the bottom end of the translucent windshield base section to the frame on the motorcycle.

The curved hinge can include pair of curved hinges each spaced apart from one another and attached to a mid-portion on the front face of the upper windshield section and to a mid-portion on the front face of the translucent windshield base section.

Each of curved hinges includes a single left hand curved hinge and a single right hand curved hinge.

Each of the curved hinges can include mounting studs with threaded ends extending to one side of the top leaf and the bottom leaf, the studs for passing through openings in the upper windshield section and the windshield base section, and nuts for threading onto the threaded ends of the mounting studs. The nuts can be acorn nuts.

The curved hinges can include a spring for biasing the hinge in an open extended position.

The trim can include a length of at least as long as a length between a left side outer edge and a right side outer edge of the upper curved windshield section. The trim can include a length greater than a length between a left side outer edge and a right side outer edge of the upper windshield section.

The trim can include a flexible gasket between the trim and the upper windshield section, and include mounting fasteners for fastening the trim and gasket to the upper windshield section.

The translucent upper section of the windshield can consist of a one piece translucent section, and the translucent lower base section consists of another one piece translucent section.

A preferred embodiment of the forward foldable windshield assembly for motorcycles, can include a curved windshield having a single translucent upper curved section with an top edge and a bottom edge, a front face and a rear face, and a single translucent lower curved base section with a top edge having an identical contour to the bottom edge of the upper curved section, and a front face and a rear face, the lower base section having a bottom end being mountable to an existing frame on a motorcycle, a pair of curved hinges, each having a top leaf attached to a front portion of the upper section of the windshield adjacent to the bottom edge, and each curved hinge having a bottom leaf attached to a front portion of the lower curved base section adjacent to the top edge of the lower base section, and a single trim with a gasket rear surface fastened across the front face of the upper windshield section covering the top leaf of the hinge, wherein the windshield folds to a forward of the motorcycle.

Each of the curved hinges can include mounting studs with threaded ends extending to one side of the top leaf and the bottom leaf, the studs for passing through openings in the upper windshield section and the windshield base section, and nuts for threading onto the threaded ends of the mounting studs. The nuts can be acorn nuts.

The curved hinges can include a spring for biasing the hinge in an open extended position.

The trim can include a flexible gasket between the trim and the upper windshield section, and include mounting fasteners for fastening the trim and gasket to the upper windshield section.

Further objects and advantages of this invention will be apparent from the following detailed description of the presently preferred embodiments which are illustrated schematically in the accompanying drawings.

BRIEF DESCRIPTION OF THE FIGURES

FIG. 3 is a front perspective view of the motorcycle of FIGS. 1-2 with a novel folding windshield ready to install.

FIG. 4 is a perspective view of the motorcycle of FIG. 3 with the folding windshield installed.

FIG. 5 is an enlarged view of FIG. 4 with the folding windshield folded forward.

FIG. 18 is a top view of the folded windshield of FIG. 14.

FIG. 19 is a bottom view of the folded windshield of FIG. 14.

FIG. 20 is a left side view of the folded windshield of FIG. 14

FIG. 21 is a right side view of the folded windshield of FIG. 14.

FIG. 24 is a front view of a right hand curved hinge used in the folding windshield of the preceding figures in its closed condition.

FIG. 25 is a rear view of the curved hinge of FIG. 24.

FIG. 30A is a front perspective view of the curved hinge of FIG. 24.

FIG. 30B is a cross-sectional view of the curved hinge of FIG. 30A along arrows 30B showing hinge lock component.

FIG. 31 is a rear perspective view of the curved hinge of FIG. 30A.

FIG. 32A is a front perspective view of the curved hinge of FIG. 24 in an opened condition.

FIG. 32B is a cross-sectional view of the curved hinge lock components of FIG. 32A along arrows 32B.

FIG. 33 is a rear perspective view of the curved hinge of FIG. 32A in an opened condition.

FIG. 35 is a front view of a left hand curved hinge used in the folding windshield of the preceding figures in a closed position.

FIG. 36 is a rear view of the curved hinge of FIG. 35.

FIG. 37 is a top view of the curved hinge of FIG. 35.

FIG. 38 is a bottom view of the curved hinge of FIG. 35.

FIG. 39 is a right side view of the curved hinge of FIG. 35.

FIG. 40 is a left side view of the curved hinge of FIG. 35.

DESCRIPTION OF THE PREFERRED EMBODIMENTS

Figure 1:
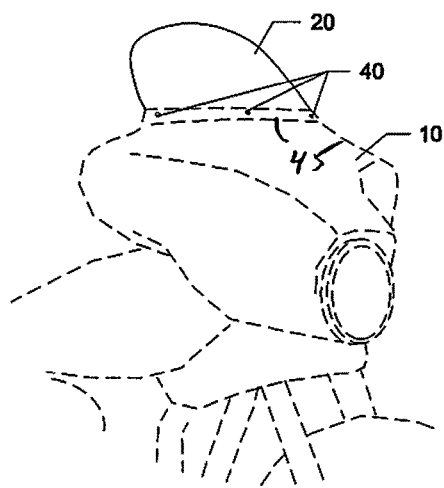
FIG. 1 is a front perspective view of motorcycle with removable prior art windshield.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
10 Motorcycle with removable windshield (Prior Art).
20 Removable windshield (Prior Art).
30 Windshield mounting slot (Prior Art).
40 Windshield mounting fastener (Prior Art).
45 Mount frame on motorcycle for windshield
50 Curved Folding Windshield (FW) assembly in unfolded configuration.
55 FW in folded configuration.
60 FW mounting slot.
70 Translucent Top section of FW.
80 Translucent Bottom section of FW.
90/150 Right hand curved windshield hinge.
100/260 Left hand curved windshield hinge.
110 Top FW section curved trim strip.
110R Outer end(s) cut to fit side edge contour of windshield
115 Trim strip gasket, such as a rubber seal.
120 Trim strip mounting fasteners (such as screws and bolts).
120H hole for threaded end of fastener 120
130 Acorn nut securing item 120 above.
140 nuts (such as acorn nut(s) securing curved hinge leafs to top and bottom FW sections.
145 Washer(s) such as flat and/or locking washers.
150 Right hand (RH) windshield curved hinge.
160 Mounting stud(s) for top RH & LH curved hinge leaf.
160H Holes in top windshield section 70 for threaded end of mounting stud 160.
170 Mounting stud(s) for bottom RH & LH hinge leaf.
170H Holes in bottom windshield section 80 for threaded end of mounting studs 170
180 Top RH curved hinge leaf.
190 Bottom RH curved hinge leaf.
195 Bent tab to limit unfolded position of top leaf relative to bottom leaf in the curved hinges
200 curved Hinge pin (universal).
210 Spring loaded hinge curved lock latch.
220 curved Hinge lock latch spring.
230 Latch catch feature on top RH curved hinge leaf knuckle.
240 Top RH curved hinge leaf knuckle.
250 Bottom RH curved hinge leaf knuckle.
260 Left hand (LH) windshield curved hinge.
270 Top LH hinge curved leaf.
280 Bottom LH curved hinge leaf.
290 Top LH hinge leaf curved knuckle.
300 Bottom LH hinge leaf curved knuckle.

Figure 2:
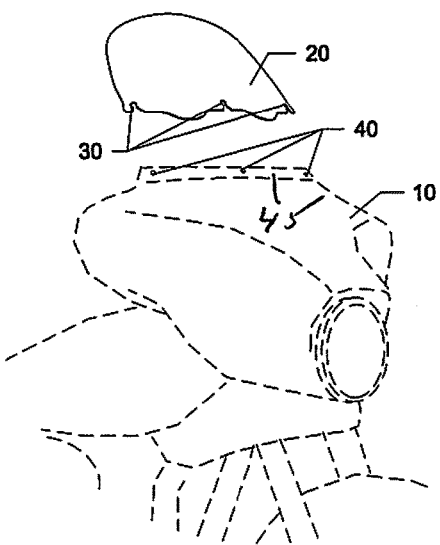
FIG. 2 is another perspective view of the motorcycle of FIG. 1 with prior art windshield removed.

FIG. 1 is a front perspective view of motorcycle 10 with removable prior art windshield 20. FIG. 2 is another perspective view of the motorcycle 10 of FIG. 1 with prior art windshield 20 removed, which shows the lower end slots and fasteners 40 used to attach the windshield in place.

FIG. 3 is a front perspective view of the motorcycle 10 of FIGS. 1-2 with a novel folding windshield 50 ready to install.

FIG. 4 is a perspective view of the motorcycle 10 of FIG. 3 with the folding windshield 50 installed in an upright unfolded position 50.

FIG. 5 is an enlarged view of FIG. 4 with the top section 70 of the folding windshield 50 folded forward in the direction of arrow F, in a folded down position 55.

Figure 6:
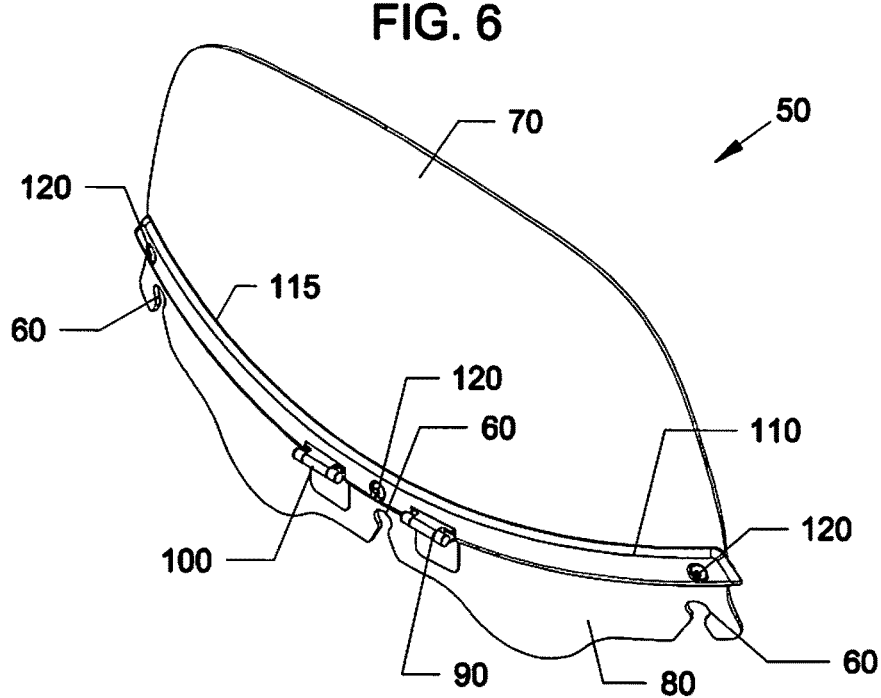
FIG. 6 is a front right perspective view of the folding windshield of FIGS. 3-5.
Figure 7:
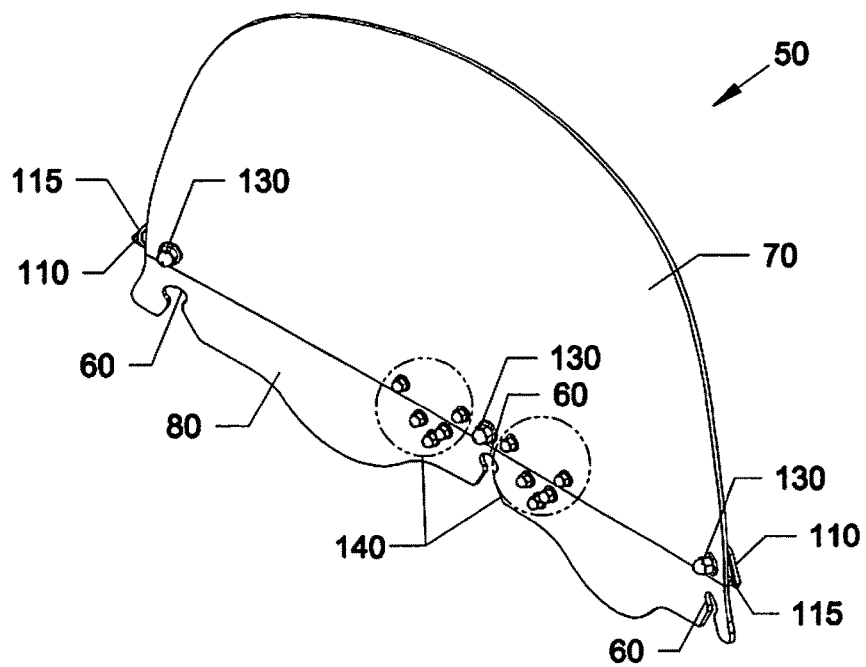
FIG. 7 is a rear right perspective view of folding windshield of FIG. 6
Figure 8:
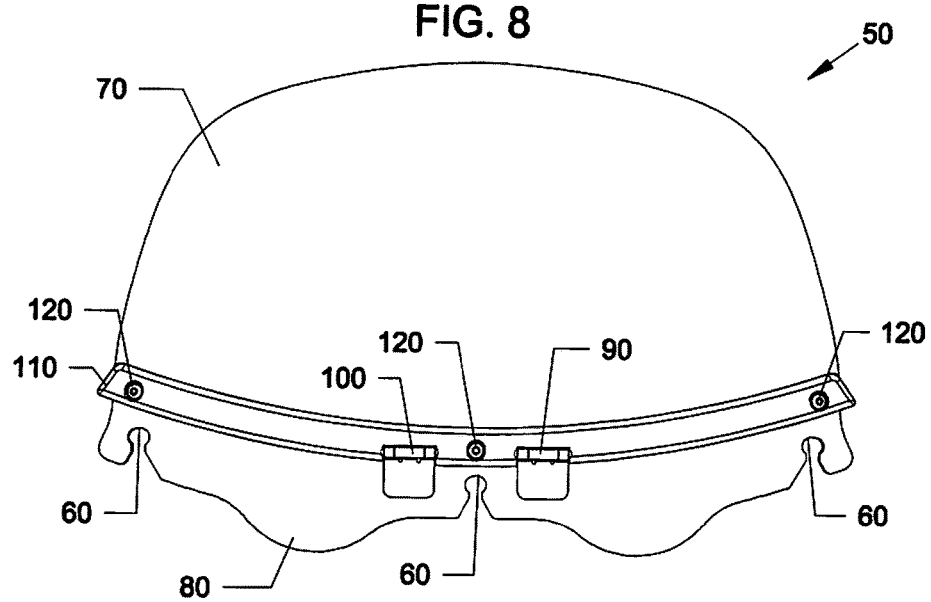
FIG. 8 is a front view of the folding windshield of FIG. 6.
Figure 9:
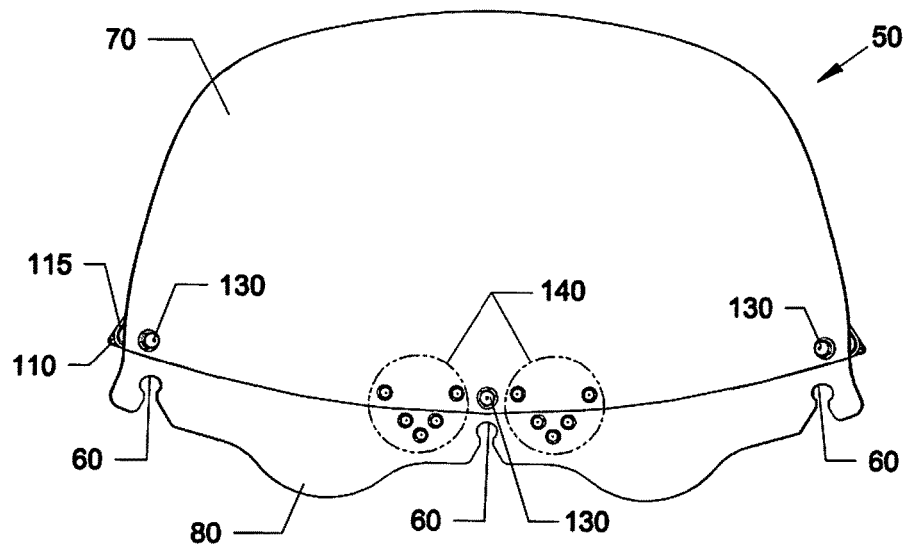
FIG. 9 is a rear view of the folding windshield of FIG. 7.
Figure 10:
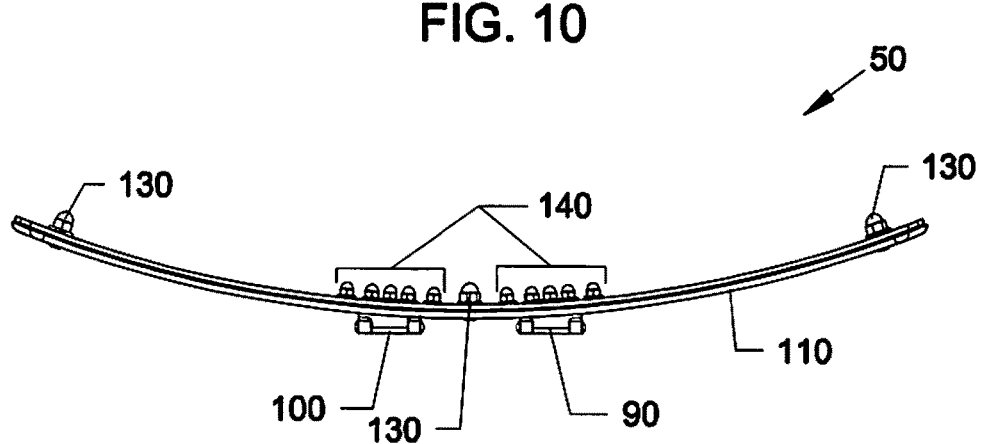
FIG. 10 is a top view of the folding windshield of FIG. 6.
Figure 11:
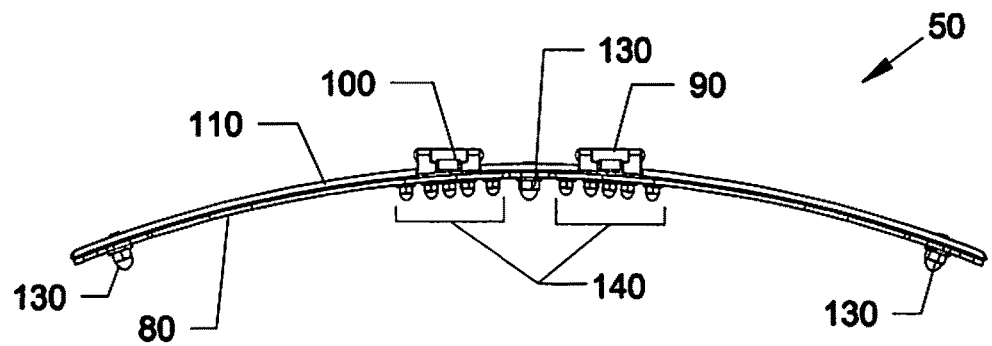
FIG. 11 is a bottom view of the folding windshield of FIG. 6.
Figure 12:
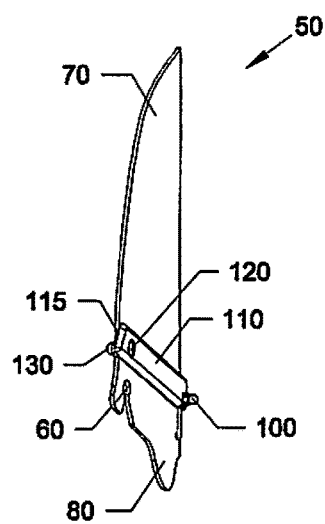
FIG. 12 is a left side view of the folding windshield of FIG. 6.
Figure 13:
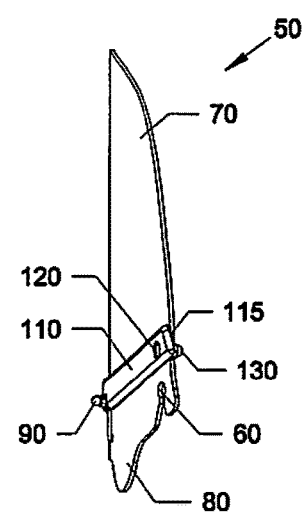
FIG. 13 is a right side view of the folding windshield of FIG. 6.

FIG. 6 is a front right perspective view of the folding windshield 50 of FIGS. 3-5. FIG. 7 is a rear right perspective view of folding windshield 50 of FIG. 6 FIG. 8 is a front view of the folding windshield 50 of FIG. 6. FIG. 9 is a rear view of the folding windshield 50 of FIG. 7. FIG. 10 is a top view of the folding windshield 50 of FIG. 6. FIG. 11 is a bottom view of the folding windshield 50 of FIG. 6. FIG. 12 is a left side view of the folding windshield 50 of FIG. 6. FIG. 13 is a right side view of the folding windshield 50 of FIG. 6.

Referring to FIGS. 6-13, the curved folding windshield 50 can include a translucent top section 70 attached to a translucent bottom section 80 by two curved hinges: a right hand curved hinge 90/150 and left hand curved hinge 100/260, with a curved trim strip (trim cover) 110 covering the exposed top leaf portion of each curved hinge 90/150, 100/160. Mounting slot(s) 60 can attach the folding windshield 50 to an upper frame mount 45 on the motorcycle (as shown in FIGS. 3-4 by using existing mounting fastener(s) 40.

Details of the curved hinges 90/150, 100/260 and how they are attached to the windshield 50 with the trim strip 110 and gasket 115 will be described in more detail in reference to FIGS. 22-42 below. The curved hinges 90/150, 100/260 and curved trim strip 110 follow the curved surface of the curved top section 110 of folding windshield 50.

Figure 14:
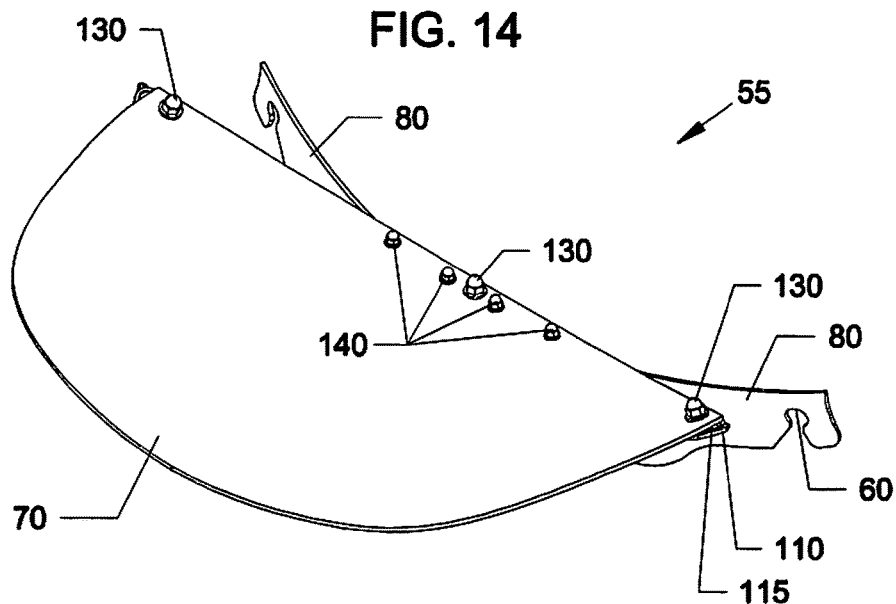
FIG. 14 is a front perspective view of folding windshield of the previous figures folded down.
Figure 15:
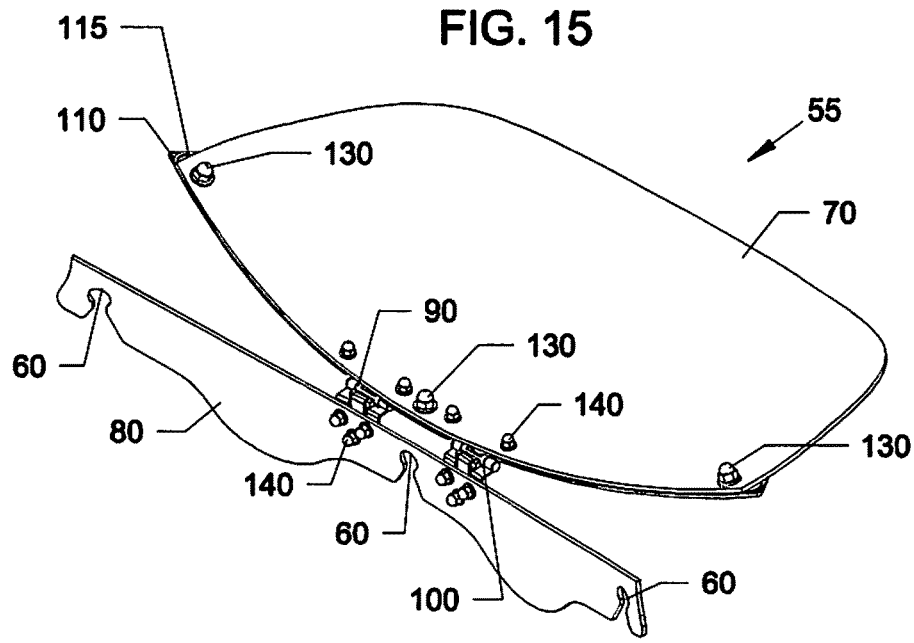
FIG. 15 is a rear perspective view of the folded down windshield of FIG. 14.
Figure 16:
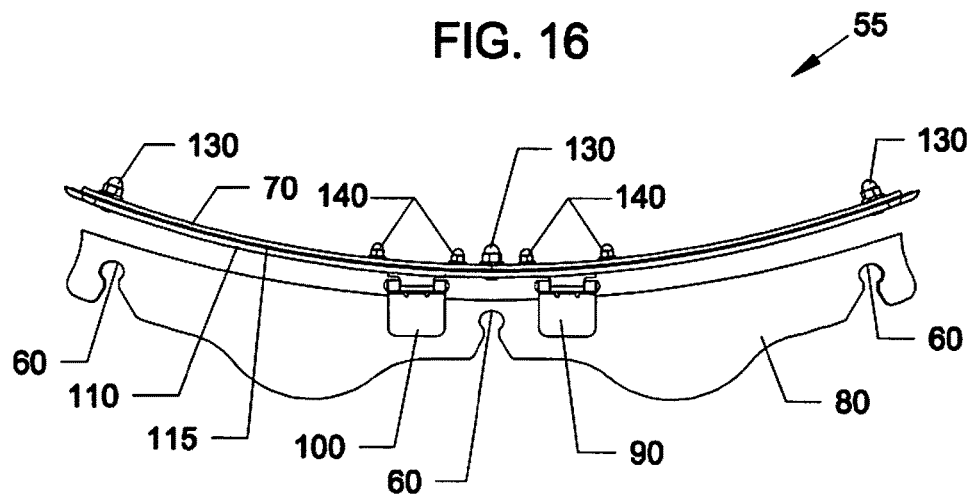
FIG. 16 is a front view of the folded windshield of FIG. 14.
Figure 17:
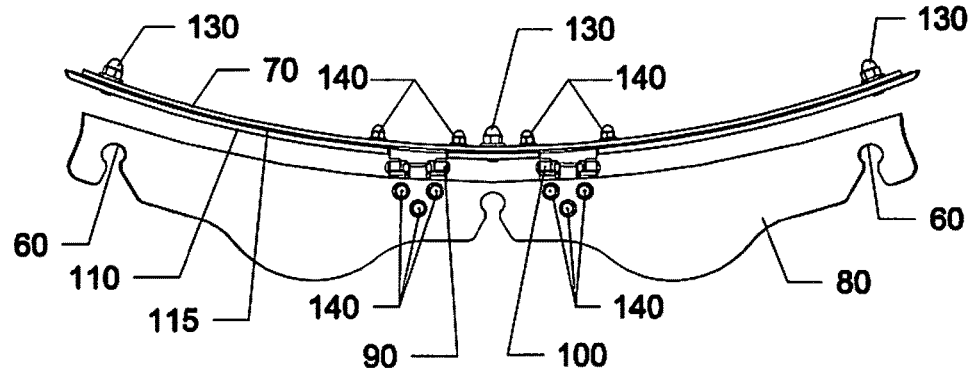
FIG. 17 is a rear view of the folded windshield of FIG. 16.

FIG. 14 is a front perspective view of folding windshield 55 of the previous figures folded down. FIG. 15 is a rear perspective view of the folded down windshield 55 of FIG. 14. FIG. 16 is a front view of the folded windshield 55 of FIG. 14. FIG. 17 is a rear view of the folded windshield 55 of FIG. 16. FIG. 18 is a top view of the folded windshield 55 of FIG. 14. FIG. 19 is a bottom view of the folded windshield 55 of FIG. 14. FIG. 20 is a left side view of the folded windshield of FIG. 14 FIG. 21 is a right side view of the folded windshield 55 of FIG. 14.

Referring to FIGS. 3-5 and 14-21, the translucent top section 70 can be folded forward relative to the mounted translucent bottom section 80 when a force is applied to the rear surface of the top section 70.

Figure 22:
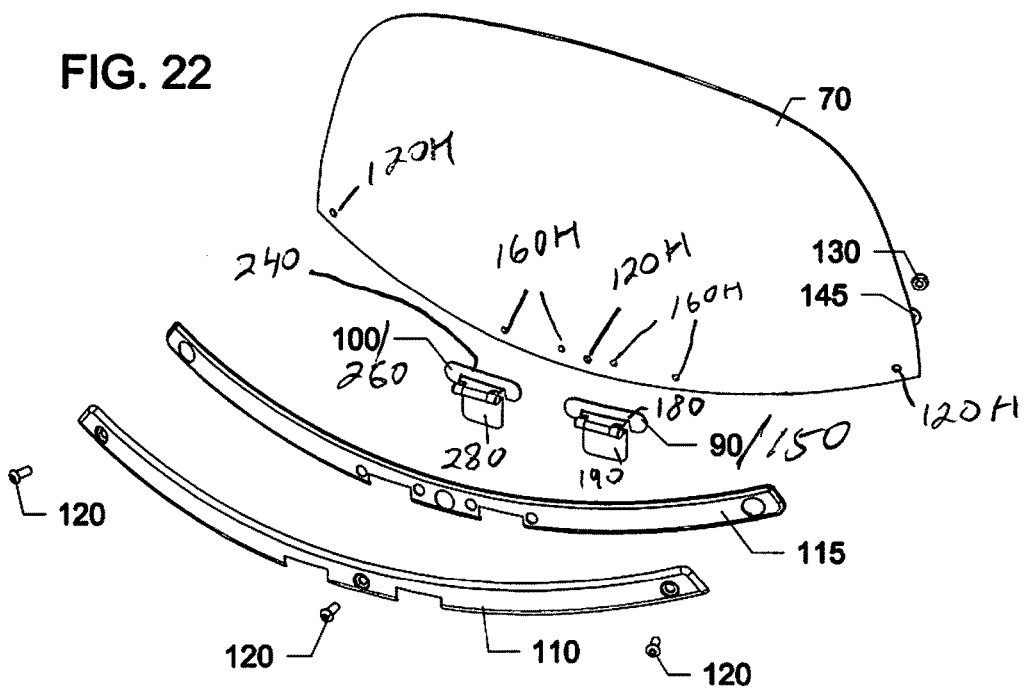
FIG. 22 is a front exploded perspective view of the top section of the folding windshield.
Figure 23:
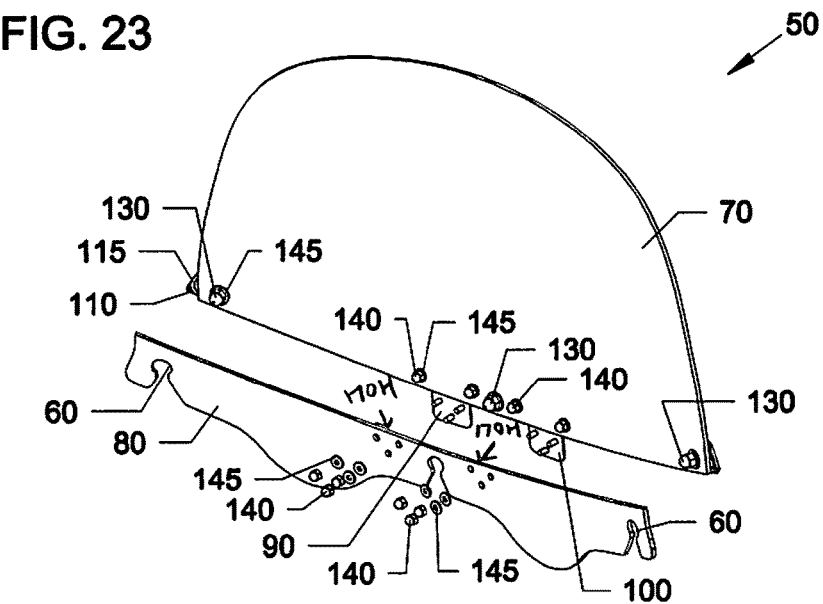
FIG. 23 is a rear perspective view of the folding windshield assembly with the bottom section exploded.

FIG. 22 is a front exploded perspective view of the top section 70 of the folding windshield 50. FIG. 23 is a rear perspective view of the folding windshield 50 with the bottom section 80 and exploded from the top section 70.

Referring to FIGS. 22-23, the top section 70 is shown with right hand curved hinge 90, left hand curved hinge 100, trim strip 110, trim gasket 115 with trim strip mounting fasteners 120 (such as bolts and screws) that mount into mateable openings 120H in the top section 70, nuts 130, 140 (such as acorn nuts), with washer(s) 145 (such as flat and/or locking washer(s)).

Referring to FIGS. 22-23, the single translucent top section 70 and the single translucent bottom section 80 can initially be formed from a single translucent windshield which is cut into the separate sections. As such, the lower edge of the top section 70 can confirm to the upper edge of the bottom section 80.

Figure 26:
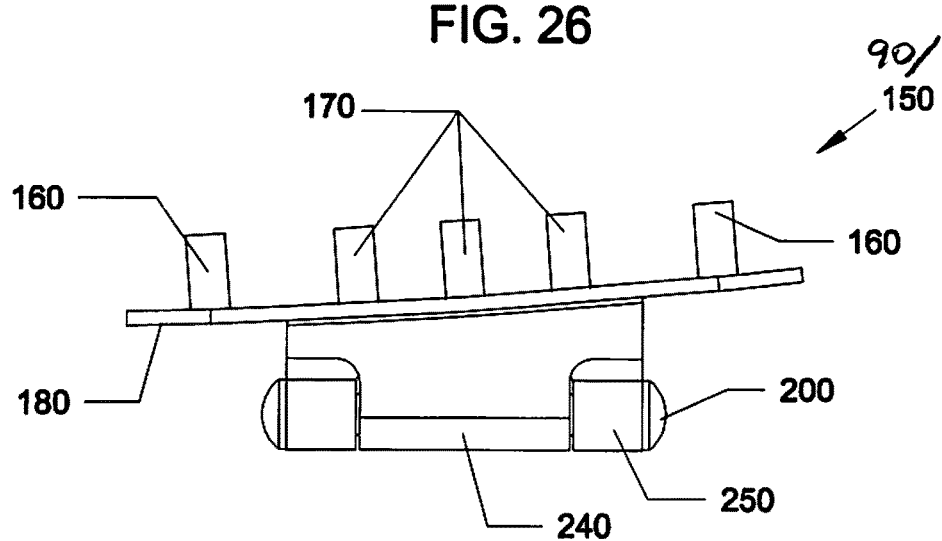
FIG. 26 is a top view of the curved hinge of FIG. 24.
Figure 27:
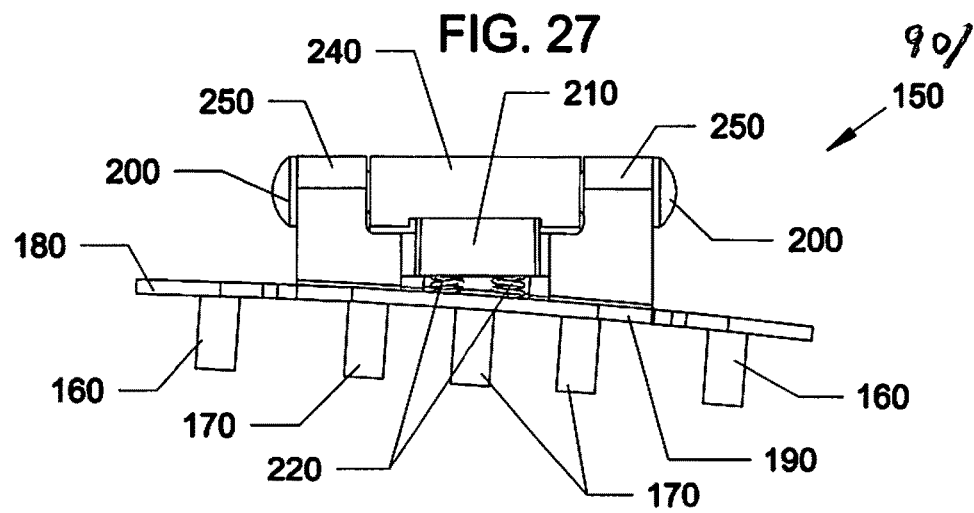
FIG. 27 is a bottom view of the curved hinge of FIG. 24.
Figure 28:
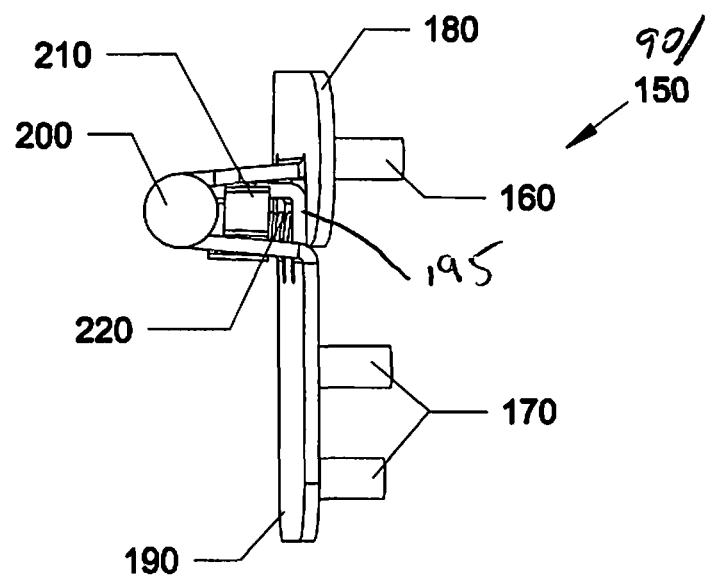
FIG. 28 is a right side view of the curved hinge of FIG. 24.
Figure 29:
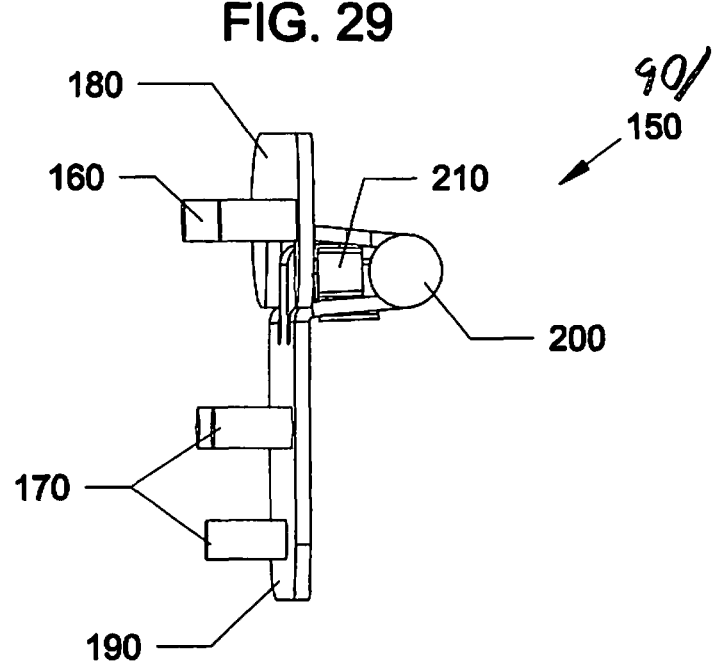
FIG. 29 is a left side view of the curved hinge of FIG. 24.

FIG. 24 is a front view of a right hand hinge 150 used in the curved folding windshield 50 of the preceding figures in its closed (expanded) upright condition. FIG. 25 is a rear view of right hand curved hinge 150 of FIG. 24. FIG. 26 is a top view of the right hand curved hinge 150 of FIG. 24. FIG. 27 is a bottom view of the right hand curved hinge 150 of FIG. 24. FIG. 28 is a right side view of the right hand curved hinge 150 of FIG. 24. FIG. 29 is a left side view of the right hand curved hinge 150 of FIG. 24.

FIG. 30A is a front perspective view of the right hand curved hinge 150 of FIG. 24. FIG. 30B is a cross-sectional view of the right hand curved hinge 150 of FIG. 30A along arrows 30B showing curved hinge lock component. FIG. 31 is a rear perspective view of the curved hinge 150 of FIG. 30A.

FIG. 32A is a front perspective view of the curved hinge 150 of FIG. 24 in an opened (folded) condition for the curved folded windshield 55 of the preceding figures. FIG. 32B is a cross-sectional view of the curved hinge lock components of FIG. 32A along arrows 32B. FIG. 33 is a rear perspective view of the curved hinge 150 of FIG. 32A in an opened condition.

Figure 34:
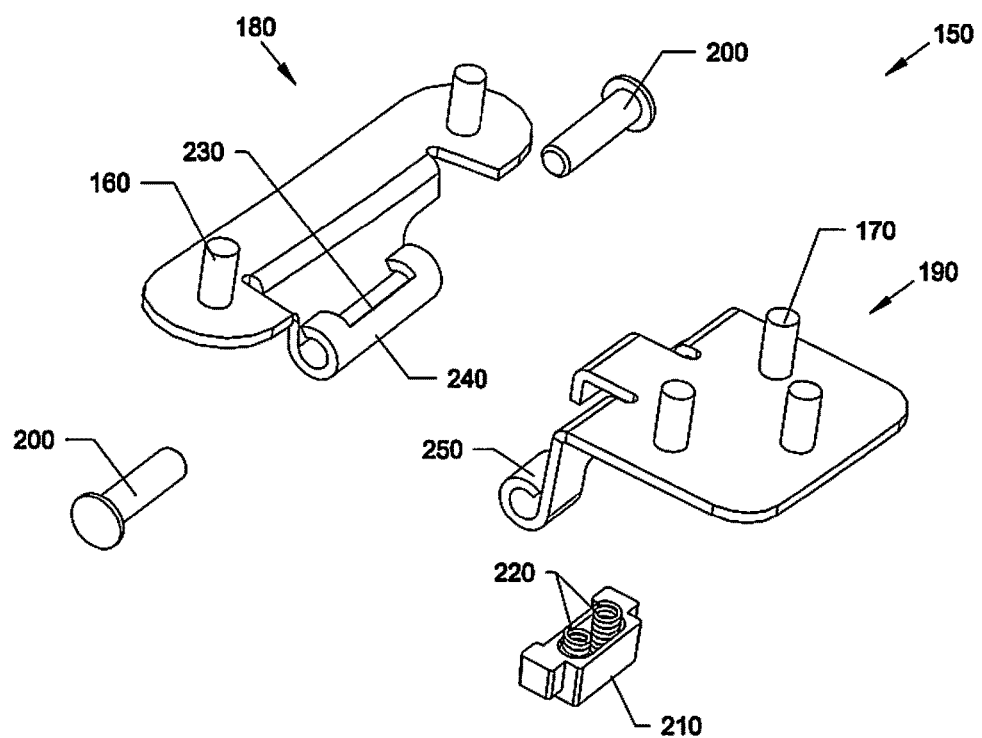
FIG. 34 is an exploded perspective view of the curved hinge of FIG. 34.

FIG. 34 is an exploded perspective view of the curved hinge 150 of FIG. 24.

Figure 41:
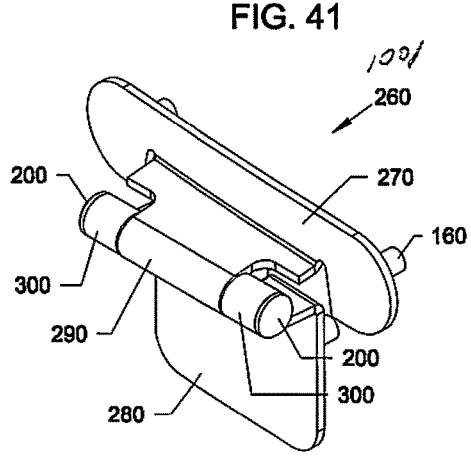
FIG. 41 is a front perspective view of the curved hinge of FIG. 35.
Figure 42:
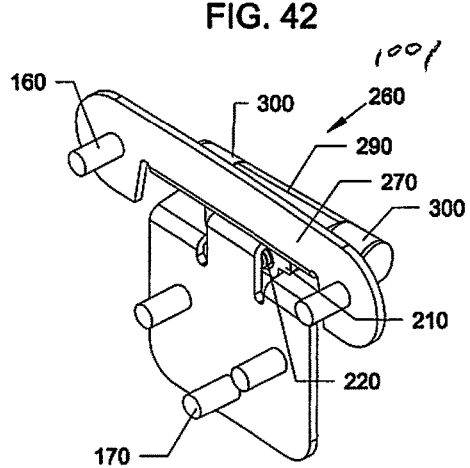
FIG. 42 is a rear perspective view of the curved hinge of FIG. 41.

FIG. 35 is a front view of a left hand curved hinge 260 used in the folding windshield 50 of the preceding figures in a closed (expanded) upright position. FIG. 36 is a rear view of the left hand curved hinge 260 of FIG. 35. FIG. 37 is a top view of the left hand curved hinge 260 of FIG. 35. FIG. 38 is a bottom view of the curved hinge 260 of FIG. 35. FIG. 39 is a right side view of the curved hinge 260 of FIG. 35. FIG. 40 is a left side view of the curved hinge 260 of FIG. 35. FIG. 41 is a front perspective view of the curved hinge 260 of FIG. 35. FIG. 42 is a rear perspective view of the curved hinge 260 of FIG. 41.

Referring to FIGS. 3, 4, 6-13, 22-31, 34-42, the novel curved windshield 50 can include the top section 70 attached to the bottom section 80 by right hand curved hinge 90/150 and left hand hinge 100/260. The threaded end of mounting studs 160 of both right hand curved hinge 90/150 and left hand curved hinge 100/260 can be placed on the front side of the top section 70 and placed through the holes 160H. Nuts 140 (such as but not limited to acorn nuts) and washers 145 (such as but not limited to flat washers and locking washers) can be located on the rear side of the top section 70 to hold and lock the top right hand curved hinge leaf 180 and top left hand curved hinge leaf 270 in place.

Similarly the threaded end of mounting studs 170 of both right hand curved hinge 90/150 and left hand curved hinge 100/260 can be placed on the front side of the bottom section 80 and placed through the holes 170H. Nuts 140 (such as but not limited to acorn nuts) and washers 145 (such as but not limited to flat washers and locking washers) can be located on the rear side of bottom section 80 to hold and lock the bottom right hand curved hinge leaf 190 and bottom left hand curved hinge leaf 280 in place.

As shown in FIG. 22 an elongated trim strip 110 having a length at least as long as the width of the top windshield section 70 can be placed over the front of the top section 70 to cover the top leafs 180, 240 with a gasket 115, such as a trim rubber seal sandwiched therebetween and held in place by fasteners 120 (such as screws and bolts) that pass through the trim strip 110 and gasket 115 and holes 120H in the top section 70 and held and locked in place by nuts 130 and washers 145.

As shown in FIG. 19, the outer end 110R of trim strip 110 can be cut off along the dotted lines on both ends of the strip 110 in order to follow the side contours of the top curved windshield section 70.

When assembled, the elongated trim strip 110 covers the upper leafs of the hinges 90/150, 100/260 between on the top section 70 of the curved windshield 50. The base section 80 of the windshield 50 is hidden beneath the existing mounting frame 45 on the motorcycle 10.

Referring to FIGS. 24-31 and 34, the right hand curved hinge 90/150 can include a top curved leaf 180 rotatably attached to a bottom curved leaf 190 by a curved hinge pin 200 passing through openings in both a top right hand curved hinge leaf knuckle 240 and a bottom right hand curved hinge leaf knuckle 250. A spring loaded curved hinge lock latch 250 with curved hinge lock latch spring 220, allows the top curved hinge leaf 180 and bottom curved hinge leaf 190 to be an open expanded position for keeping the curved windshield 50 in an unfolded position as shown in FIGS. 3, 4 and 6-13.

Referring to FIGS. 35-41, the left hand curved hinge 100/260 also includes a top curved hinge leaf 270 rotatably attached to a bottom curved hinge leaf 280 by a curved hinge pin 200 passing through openings in both a top left curved hand leaf knuckle 290 and a bottom left hand curved leaf knuckle 300. Similarly, a spring loaded hinge lock latch 250 with curved hinge lock latch spring 220, allows the top curved hinge leaf 270 and bottom curved hinge leaf 280 to be in an open expanded position for keeping the curved windshield 50 in an unfolded position as shown in FIGS. 3, 4 and 6-13.

Referring to FIGS. 24-31 and 34-45, a bent tab 195 extending up from the bottom curved leaf(s) 190, 280 can be used to limit the unfolded position of top curved leafs 180/240 relative to bottom curved leafs 190/250 in the hinges 90/150 and 100/260 by abutting against the latch catch 230 in the top right hand curved hinge leaf 180 and top left hand curved hinge leaf 270.

Referring to FIGS. 5, 14-21, 32A, 32B, 33, 34, a force F pushing against a rear side of the top curved windshield section 70 can push against the curved hinge lock latch spring 220 allowing the top section 70 fold outward relative to the mounted bottom section 80 by rotating along curved hinges 90/100 and 150/260.

The novel windshield invention can be mounted to a motorcycle fairing in a flexible manner that allows movement (rotation) of the top section 70 of the windshield in a forward direction which reduces or avoids impact of the head of the rider against the windshield. Such movement reduces or avoids the severity of head impacts, and damage caused by the rigid windshields that are conventional for motorcycles.

The novel windshield invention can be factory installed or dealership installed, or can be sold as a new kit or replacement kit for motorcycles. The novel invention can be a retrofit for motorcycles.

Although the drawings show the invention being with motorcycles, the invention can be used with other vehicles where a curved windshield is used, such as but not limited to being on scooters, jet skis, boats, and other vehicles, and the like.

Although the embodiments show a trim strip 110 and gasket 115 covering only the top leafs 180, 240 of the hinges 90/150 and 100/260, another trim hinge can be used to cover the bottom leafs The curved hinges 90/150 and 100/260 and related fasteners 120, 130, 140, 145, can be formed from metal, such as but not limited to stainless steel, zinc coated metal, and the like. The trim strip 110 can be formed from metal, such as but limited to stainless steel, aluminum and plastics, and the like.

The windshield top and bottom sections 70, 80 can be formed from a translucent material, such as but not limited to acrylic, tempered glass, and other materials and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A retrofit windshield for a motorcycle consisting of:
   a curved windshield having a translucent upper curved section with a top edge and a bottom edge, a front face and a rear face, and a translucent lower base section with a top edge having an identical contour to the bottom edge of the upper curved section, and a front face and a rear face, the lower base section having a bottom end being mountable to an existing frame on a motorcycle;
   a pair of curved hinges each spaced apart from one another and attached to a mid-portion on the front face of the upper curved section and to a mid-portion on the front face of the lower base section;
   each curved hinge consisting of a top leaf attached at a mid-point to a front portion of the upper section of the windshield adjacent to the bottom edge, and each curved hinge having a bottom leaf attached at a mid-point to a front portion of the lower base section adjacent to the top edge of the lower base section, each curved hinge having side by side knuckles which together have a knuckles length, each top leaf having a width length with opposite facing side ends, the side ends extending beyond the knuckles length, so that top fasteners attach the top leaf to the upper curved section through the side ends of the top leaf, each bottom leaf having a width length no greater than the knuckles length, so that bottom fasteners attach the bottom leaf to the lower base section through the bottom leaf; and
   a trim across the front face of the upper windshield section covering the top leaf of each curved hinge, wherein the windshield folds to a front of the motorcycle when a force is applied to a rear surface to the upper windshield section.

2. The retrofit windshield of claim 1, wherein the pair of curved hinges includes a single left hand curved hinge and a single right hand curved hinge.

3. The retrofit windshield of claim 1 wherein each of the top and bottom fasteners includes:
   mounting studs with threaded ends extending to one side of the top leaf and the bottom leaf, the studs for passing through openings in the upper windshield section and the windshield base section and
   nuts for threading onto the threaded ends of the mounting studs.

4. The retrofit windshield of claim 3, wherein the nuts include acorn nuts.

5. The retrofit windshield of claim 1, wherein each curved hinge includes:
   a spring for biasing the hinge in an open extended position.

6. The retrofit windshield of claim 1, wherein the trim includes a length of at least as long as a length between a left side outer edge and a right side outer edge of the upper curved windshield section.

7. The retrofit windshield of claim 1, wherein the trim includes a length greater than a length between a left side outer edge and a right side outer edge of the upper windshield section.

8. The retrofit windshield of claim 7, further comprising:
   a flexible gasket between the trim and the upper windshield section.

9. The retrofit windshield of claim 8, further comprising:
   mounting fasteners for fastening the trim and gasket to the upper windshield section.

10. The retrofit windshield of claim 1, wherein the translucent upper section consists of a one piece translucent section, and the translucent lower base section consists of another one piece translucent section.

11. A forward foldable windshield assembly for motorcycles, consisting of:
    a curved windshield having a single translucent upper curved section with an top edge and a bottom edge, a front face and a rear face, and a single translucent lower curved base section with a top edge having an identical contour to the bottom edge of the upper curved section, and a front face and a rear face, the lower base section having a bottom end being mountable to an existing frame on a motorcycle;
    a pair of curved hinges, each spaced apart from one another, each having a top leaf attached to a mid-portion on a front face of the upper section of the windshield adjacent to the bottom edge, and each curved hinge having a bottom leaf attached to a mid-portion on a front face of the lower curved base section adjacent to the top edge of the lower base section;
    each curved hinge consisting of a top leaf attached at a mid-point to a front portion of the upper section of the windshield adjacent to the bottom edge, and each curved hinge having a bottom leaf attached at a mid-point to a front portion of the lower base section adjacent to the top edge of the lower base section, each curved hinge having side by side knuckles which together have a knuckles length, each top leaf having a width length with opposite facing side ends, the side ends extending beyond the knuckles length, so that top fasteners attach the top leaf to the upper curved section through the side ends of the top leaf, each bottom leaf having a width length no greater than the knuckles length, so that bottom fasteners attach the bottom leaf to the lower base section through the bottom leaf; and
    a single trim with a gasket rear surface fastened across the front face of the upper windshield section covering the top leaf of the hinge, wherein the windshield folds to a front of the motorcycle in a vertical to horizontal direction.

12. The windshield assembly of claim 11, wherein the trim includes:
    a flexible gasket between the trim and the upper windshield section.

13. The windshield assembly of claim 11, wherein the translucent upper section consists of a one piece translucent section, and the translucent lower base section consists of another one piece translucent section.

14. The windshield assembly of claim 11, wherein the translucent upper section and the translucent lower base section are only formed from a single translucent curved windshield section that is cut into the separate upper section and the lower base section with the lower edge of the top section having an identical contour to the upper edge of the bottom section.

* * * * *